(12) United States Patent
Ramalingam et al.

(10) Patent No.: US 11,032,168 B2
(45) Date of Patent: Jun. 8, 2021

(54) MECHANISM FOR PERFORMANCE MONITORING, ALERTING AND AUTO RECOVERY IN VDI SYSTEM

(71) Applicant: AMZETTA TECHNOLOGIES, LLC, Norcross, GA (US)

(72) Inventors: Muthukkumaran Ramalingam, Duluth, GA (US); Nanda Kumar KR, Chennai (IN); Caarthyk Mano Sundar V., Chennai (IN); Varadachari Sudan Ayanam, Suwanee, GA (US); Joseprabu Inbaraj, Suwanee, GA (US)

(73) Assignee: AMZETTA TECHNOLOGIES, LLC, Norcross, GA (US)

( * ) Notice: Subject to any disclaimer, the term of this patent is extended or adjusted under 35 U.S.C. 154(b) by 143 days.

(21) Appl. No.: 15/644,027

(22) Filed: Jul. 7, 2017

(65) Prior Publication Data

US 2019/0014018 A1 Jan. 10, 2019

(51) Int. Cl.
| | |
|---|---|
| H04L 12/26 | (2006.01) |
| H04L 12/24 | (2006.01) |
| G06F 9/455 | (2018.01) |
| G06F 9/48 | (2006.01) |
| G06F 9/50 | (2006.01) |
| G08B 5/22 | (2006.01) |

(Continued)

(52) U.S. Cl.
CPC .............. *H04L 43/04* (2013.01); *G06F 9/455* (2013.01); *G06F 9/45533* (2013.01); *G06F 9/45558* (2013.01); *G06F 9/48* (2013.01); *G06F 9/50* (2013.01); *G06F 9/5083* (2013.01); *G06F 11/0766* (2013.01); *G06F 11/0784* (2013.01); *G08B 5/22* (2013.01); *G08B 25/08* (2013.01); *H04L 41/04* (2013.01); *H04L 41/06* (2013.01); *H04L 41/0681* (2013.01); *H04L 41/0686* (2013.01); *H04L 43/00* (2013.01); *H04L 43/06* (2013.01); *H04L 43/08* (2013.01); *H04L 43/0817* (2013.01)

(58) Field of Classification Search
CPC .. G06F 9/455; G06F 9/45533; G06F 9/45558; G06F 9/50; G06F 9/48; G06F 9/5083; G06F 11/0766; G06F 11/0784; H04L 43/08; H04L 43/0817; H04L 43/0876; H04L 43/10; H04L 43/00; H04L 43/04; H04L 41/04; H04L 41/06; H04L 43/06
See application file for complete search history.

(56) References Cited

U.S. PATENT DOCUMENTS

| | | | | |
|---|---|---|---|---|
| 8,321,558 | B1 * | 11/2012 | Sirota | G06F 9/5011 709/224 |
| 9,588,795 | B2 * | 3/2017 | McWilliams | G06F 21/121 |
| 10,129,114 | B1 * | 11/2018 | Kowalski | H04L 43/16 |

(Continued)

*Primary Examiner* — Charles M Swift
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus retrieves health and performance data of one or more hypervisors of the VDI system from a data store. The apparatus also determines that a first hypervisor of the one or more hypervisors is in an alert condition based on the health and performance data. The apparatus then sends an alert message in accordance with the alert condition to an alert destination.

14 Claims, 12 Drawing Sheets

(51) Int. Cl.
  *G08B 25/08*  (2006.01)
  *G06F 11/07*  (2006.01)

(56) References Cited

U.S. PATENT DOCUMENTS

| | | | | |
|---|---|---|---|---|
| 10,133,619 | B1* | 11/2018 | Nagpal | G06F 11/079 |
| 2005/0068971 | A1* | 3/2005 | Meisl | H04L 41/0213 |
| | | | | 370/401 |
| 2007/0130305 | A1* | 6/2007 | Piper | G06F 9/45558 |
| | | | | 709/223 |
| 2013/0166329 | A1* | 6/2013 | Arnoux-Prost | G06Q 10/02 |
| | | | | 705/5 |
| 2013/0198285 | A1* | 8/2013 | Ourega | G06Q 10/107 |
| | | | | 709/204 |
| 2013/0340097 | A1* | 12/2013 | Gowel | G06Q 10/10 |
| | | | | 726/28 |
| 2014/0109237 | A1* | 4/2014 | Novick | G06F 21/10 |
| | | | | 726/27 |
| 2014/0325058 | A1* | 10/2014 | Fletcher | H04L 43/045 |
| | | | | 709/224 |
| 2014/0330981 | A1* | 11/2014 | Sirota | G06F 9/485 |
| | | | | 709/226 |
| 2016/0139949 | A1* | 5/2016 | Jagannath | G06F 9/5022 |
| | | | | 718/1 |
| 2016/0147550 | A1* | 5/2016 | McWilliams | G06F 21/121 |
| | | | | 718/1 |
| 2016/0359704 | A1* | 12/2016 | Gandham | H04L 63/1425 |
| 2017/0048099 | A1* | 2/2017 | Hobbs | H04L 41/065 |
| 2017/0235596 | A1* | 8/2017 | Vankadaru | G06F 9/45558 |
| | | | | 718/1 |

* cited by examiner

MECHANISM FOR PERFORMANCE MONITORING, ALERTING AND AUTO RECOVERY IN VDI SYSTEM

BACKGROUND

Field

The present disclosure relates generally to computer systems, and more particularly, to techniques of monitoring health and performance of one or more hypervisors of a virtual desktop infrastructure (VDI) system and generating alerts when the hypervisors are in certain alert conditions.

Background

The statements in this section merely provide background information related to the present disclosure and may not constitute prior art.

Computer virtualization is a technique that involves abstracting a physical computing machine platform into a virtual machine (VM) that is executed under the control of virtualization software running on a single hardware computing platform (also referred to herein as a "host system" or a "host computer"). A group of hardware computing platforms may be organized as a cluster to provide the hardware resources for virtual machines. In a server or data center that employs virtual machines, it is common to see hundreds, even thousands, of virtual machines running on multiple clusters of host systems.

For ease of deployment, software management, and hardware cost reduction reasons, virtual machines have been used to support virtual desktops for use in an organization in place of physical workstations. A VDI system can have a number of physical servers with many VMs running on the physical servers. In certain configurations, the hardware and software resources of the servers (e.g., hypervisor servers and storage servers) of the VDI system area heavily utilized. Accordingly, there is a need to continuously monitor hardware and software resources of the VDI system keep maximum availability of the VDI system.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus retrieves health and performance data of one or more hypervisors of the VDI system from a data store. The apparatus also determines that a first hypervisor of the one or more hypervisors is in an alert condition based on the health and performance data. The apparatus then sends an alert message in accordance with the alert condition to an alert destination.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
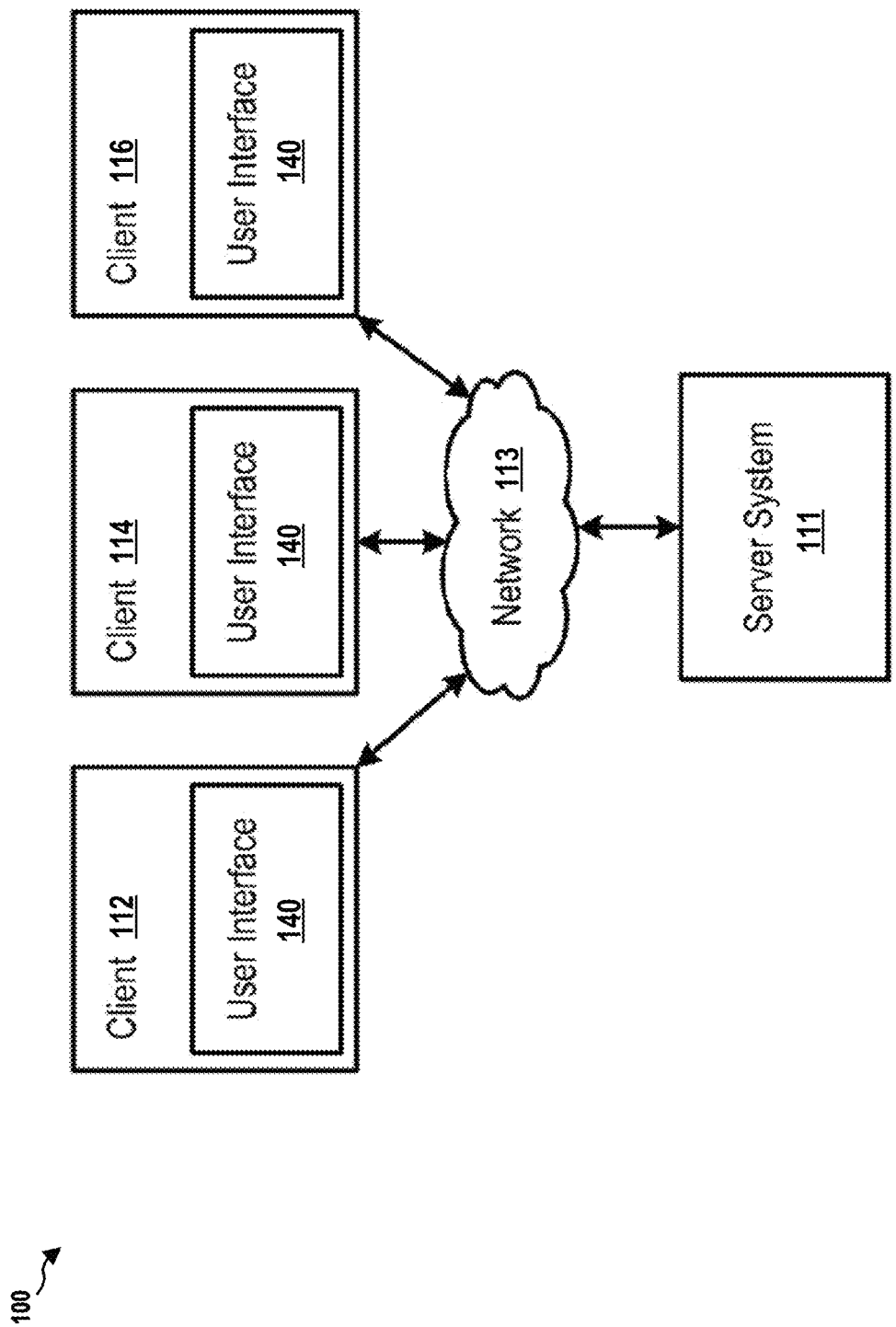
FIG. 1 illustrates a VDI system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 illustrates a virtual desktop infrastructure (VDI) system 100. The term, "desktop" refers to a human interface environment through which users can launch, interact with, and manage the user's applications, settings, and data. Traditionally, a desktop is presented by an operating system on a video display, and a user interacts with the desktop using a mouse and keyboard. Applications, documents, and other files may be displayed on the desktop and user input can be received by applications visible to the user on the display. The term "desktop" is also known to be used to refer to a physical computer system or "physical desktop" that might be placed on or near a user's desk, which is distinct from a "laptop" or "handheld," but as used herein, the term "desktop" by itself refers to the human interface environment described above, and not a physical computer system. Using computer virtualization, a user's computer system, including operating system settings, applications and application settings, and data may be transferred or copied as a virtual machine from one physical computer to another. When a virtual machine is copied in this way, the user can access his or her "desktop" from the physical computer system containing the original virtual machine, or the physical computer system containing the copy. The "desktop," therefore, is no longer tied to a particular physical computer system.

The VDI system 100 includes a VDI server system 111 in data communication over a network 113 with several VDI client systems 112, 114, and 116. The network 113 may be any configuration, such as a local area network (LAN), or private or publicly accessible wide area network (WAN), such as the Internet. It should be recognized that FIG. 1 shows a simplified representation of a typical VDI server system 111, which may include other components such as firewalls, connection brokers, and load balancers, as well as back-end storage networks, database servers, among others, as described in greater detail in FIG. 2. Each client system 112, 114, 116 may include a user interface 140 through which a user can interact with his or her desktop.

Figure 2:
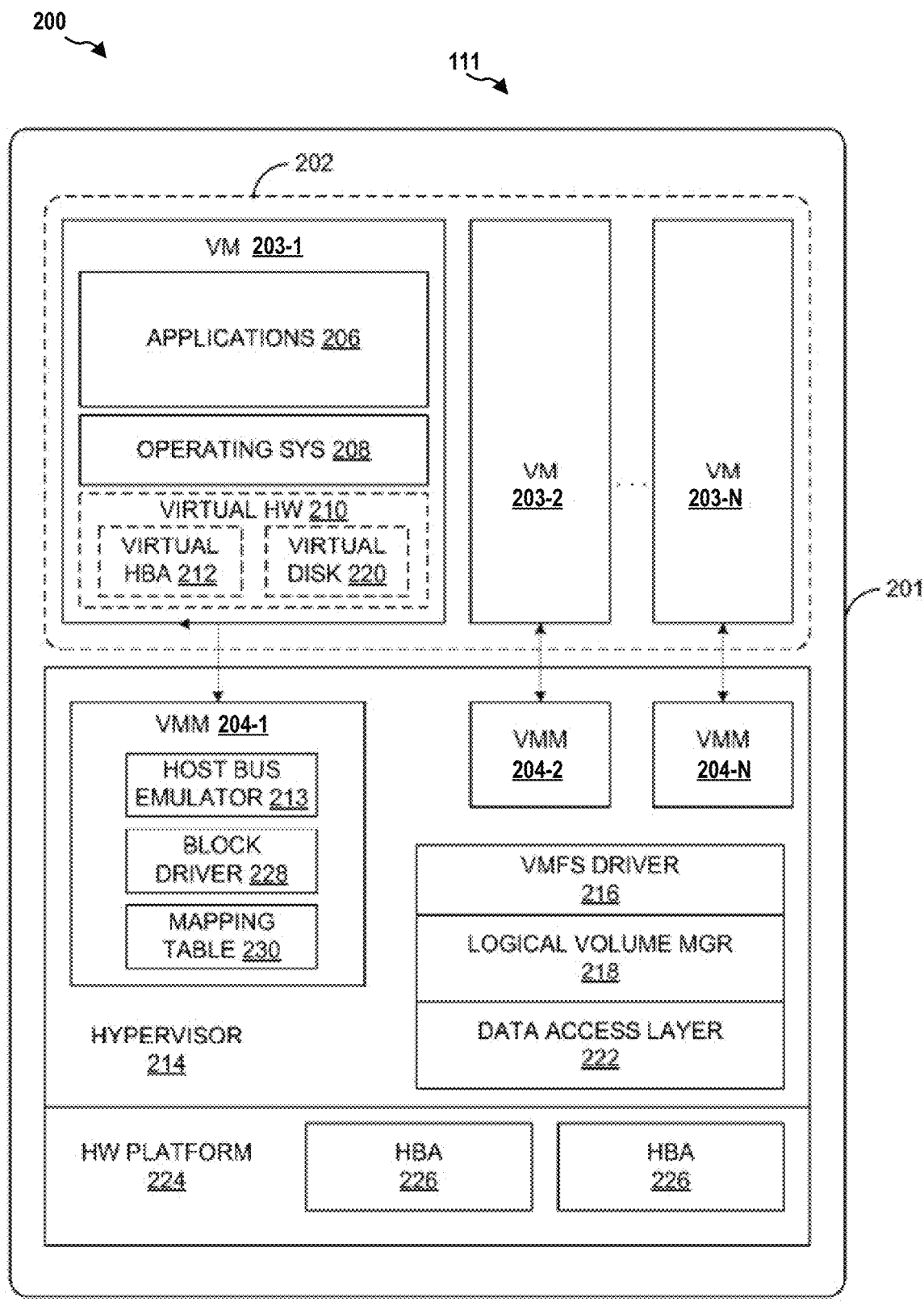
FIG. 2 is diagram illustrating a VM-based system.

FIG. 2 is diagram 200 illustrating the server system 111. The server system 111 includes an integral computer system 201 constructed on a hardware platform 224, including host bus adapters (HBAs) 226 in addition to a processor, memory, and other standard peripheral components (not separately shown). The hardware platform 224 executes a hypervisor 214 supporting a virtual machine execution space 202 within which virtual machines (VMs) 203-1 to 203-N are executed.

The hypervisor 214 provides services and support to enable concurrent execution of VMs 203-1 to 203-N. In turn, each of the VMs 203-1 to 203-N implements a virtual hardware platform 210 as a conceptual layer that supports the execution of a guest operating system 208 and one or more client applications 206 (which may be encapsulated in "application containers," as further discussed below). In certain configurations, the guest operating systems 208 are instances of MICROSOFT® WINDOWS®, LINUX®, etc. Other guest operating systems can be equivalently used. In each instance, a guest operating system 208 includes a native file system layer, typically either an NTFS (New Technology File System) or a ext3 (third extended) file system file system layer. These file system layer interface with the virtual hardware platforms 210 to access, from the perspective of guest operating systems 208, a data storage host bus adapter. In one implementation, virtual hardware platform 210 implements a virtual host bus adapter 212 and a virtual-disk 220 that emulate the necessary system hardware support to enable execution of the guest operating system 208 transparently to the virtualization of the system hardware.

File system calls initiated by guest operating system 208 to perform file system-related data transfer and control operations on virtual-disk 220 are processed and passed through the virtual host bus adapter 212 to adjunct a virtual machine monitor (VMM) 204-1 that implements the virtual system support necessary to coordinate operation with the hypervisor 214. In particular, a host bus emulator 213 functionally in the VMM 204-1 enables the data transfer and control operations to be ultimately passed to the host bus adapters 226. Further, the VMM 204-1 may also include a block driver 228 and accesses a mapping table 230 to assist VMM 204-1 in determining a storage location of data requested by the file system calls from guest operating system 208. For example, upon receiving a file system block level request to read data, the host bus emulator 213 may request the block driver 228 to determine whether the requested file blocks match an entry in mapping table 230. If mapping table 230 includes such an entry, then block driver 228 re-directs the file system block level request to a location specified in the entry of the mapping table 230 rather than allowing the file system block level request to be satisfied by a storage location of virtual-disk 220, itself, as would typically occur. In either case, file system calls for performing data transfer and control operations generated, for example, by applications 206 are translated and passed to a virtual machine file system (VMFS) driver or component 216 that manages access to files (e.g., virtual disks, etc.) stored in data storage systems networked with the server system 111 that may be accessed by any of the VMs 203-1 to 203-N.

For example, a guest operating systems 208 can receive file system calls and perform corresponding command and data transfer operations against virtual disks, such as virtual SCSI (Small Computer System Interface) devices accessible through virtual HBA 212, that are visible to the guest operating systems 208 (e.g., as a virtual-disk 220, etc.). These virtual disks 220 are maintained as files stored on a VMFS, for example, in a storage system networked to the server system 111. Each such virtual-disk 220 may be maintained as a file or set of files stored on a VMFS, for example, in the networked storage system. Guest operating system 208 file system calls are translated from instructions applicable to virtual-disk 220, which is visible to the guest operating system 208, to instructions applicable to a file representing virtual-disk 220 in the networked storage system exposed by a storage system manager to the VMFS. Such translations are performed through a number of component layers of an IO (input/output) stack, beginning at the guest operating system 208 (which receives the file system calls from applications 206), through the virtual HBA 212, the host bus emulator 213, the block driver 228, the VMFS driver 216, a logical volume manager 218, which assists the VMFS driver 216 with mapping files stored in the VMFS with the storage system exposed by the storage system manager, a data access layer 222, including device drivers, and host bus adapters 226 (which, for example, issue a SCSI command to the storage system manager to access storage system).

It should be recognized that the various terms, layers, and categorizations used to describe the virtualization components in FIG. 2 may be referred to differently without departing from their functionality or the spirit or scope of embodiments described herein. For example, while the block driver 228 and the mapping table 230 have been depicted as part of the VMM 204-1, it should be recognized that alternative configurations may implement the block driver 228 as part of a different component of hypervisor 214. Furthermore, while one configuration may implement a mapping table 230 for each corresponding virtual-disk 220, alternative configurations may utilize a global mapping table that includes mappings for all virtual disks. Similarly, it should be recognized that while the VMs 203-1 to 203-N may be considered separate virtualization components between the VMs 203-1 to 203-N and the hypervisor 214 (which, in such a configuration, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative configuration, for example, the conceptual layer described as virtual hardware platform 210 may be merged with and into the VMMs 204-1 to 204-N such that the virtual host bus adapter 212 may be removed from FIG. 2, as its functionality is effectuated by the host bus adapter emulator 213.

At the hypervisor level, the block driver 228 monitors for block read requests that fall into the mapping table 230. If a block read request falls into one of the mappings in the mapping table 230, the hypervisor 214 redirects the block read request to an external data storage/source that stores the requested data and then passes the data back to the file system implementation requesting the data.

In certain configurations, applications 206 that are to be delivered via the virtual desktop are encapsulated in application containers. An application container is a data structure that captures an application in an OS-neutral format. In one implementation for generating such application containers, a standard operating system is scanned as a reference point. The scanning process scans the registry and the file system and generates a list of all the components that are present. Then, the application that is being captured into the application container is installed onto the standard operating system. The installation adds one or more files and makes one or more registry changes to the system. Once the application is completely installed, a post-installation scan of the system is performed and a second list is generated that includes the new additions to the system caused by the installation. Differences in the files and registry changes (and any other changes) between the pre-installation scan list and the post-installation scan list are determined. The resulting files (including an executable of the actual application itself) and registry entries are then stored in an "application container" that may further contain a runtime component and that is itself stored, for example, within a virtual disk of a user's virtual desktop, and that serves as the executable file for the application.

When the user launches the application container (e.g., from the file system of the guest OS of the virtual desktop), the runtime component of the application container executes the code of the application itself (which is embedded in the application container, as previously discussed) and intercepts and redirects any requests by the application code to access registry values and/or files back into the application container itself, to the extent such registry values and/or files were stored in application container, as previously discussed. Because applications captured in such OS-neutral application containers are self-contained, they can be updated (e.g., replaced with a new version of the application, etc.) in a virtual desktop image without interfering with other components of the virtual desktop, enabling such application containers in the virtual desktop to be updated more efficiently, as described in greater detail herein.

In certain configurations, the applications 206 are do not utilize application containers and are actually installed and copied to the file system of the guest OS of the virtual desktop run in the VM 203-1.

The respective virtual desktop run in each of the VMs 203-1 to 203-N includes an OS (operating system), which can be stored in an "OS store," and one or more applications, which can be stored in an "application store," for example, to be accessed by virtual desktops in the form of application containers.

In one configuration, the OS store and/or the application store are locations in networked storage accessible by the server system 111 that respectively store a number of OS images or application containers that can be selected by an administrator or other user when generating a virtual desktop (e.g., sometimes also referred to as a blob (binary large object) store).

In one example, the virtual desktop of the VM 203-1 may include metadata for use by the file system of virtual desktop (e.g., file descriptors of application containers accessible by the file system of the guest OS, etc.) that, for example, provide data block addresses of virtual-disk 220 that purportedly store the application data.

Further, the VMM 204-1 may include a mapping table 230 for the virtual desktop for use by the hypervisor 214 that maps the data block addresses that purportedly contain the application data in virtual-disk 220 to the actual location of data blocks of the application data of a networked storage system.

Figure 3:
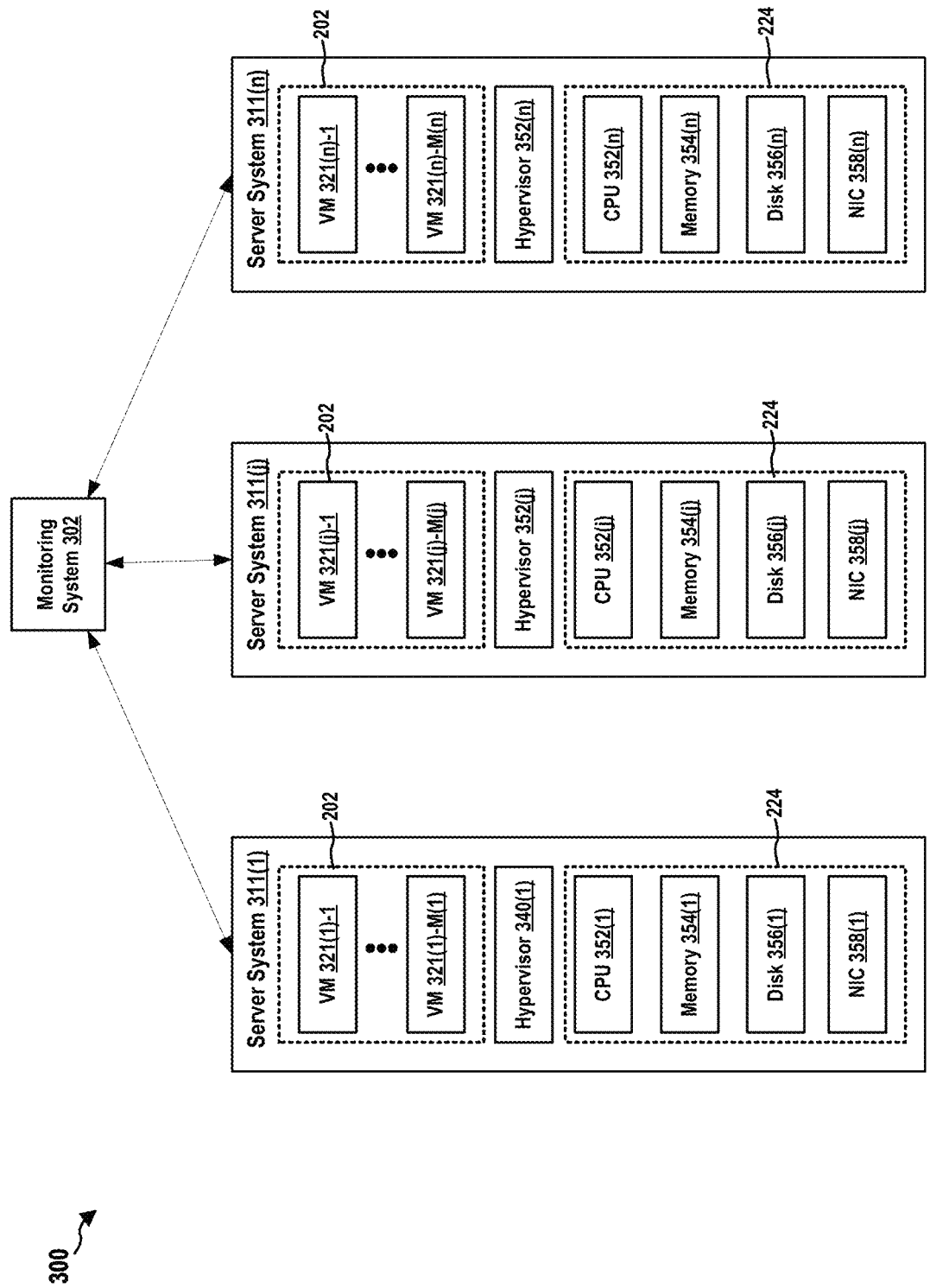
FIG. 3 is diagram illustrating server systems of the VDI system.

FIG. 3 is diagram 300 illustrating server systems 311(1) to 311(n) of a VDI system, n being an integer greater than 1. Each of the server systems 311(1) to 311(n) may be a system that is identical or similar to the server system 111. Using the server system 311(1) as an example, the server system 311(1) includes a hardware platform 224 having a CPU 352(1), a memory 354(1), a disk 356(1), and a NIC 358(1) (network interface card). A hypervisor 340(1) is running on the hardware platform 224 of the server system 311(1). Further, the hypervisor 340(1) provides a virtual machine execution space 202 that is currently executing VMs 321(1)-1 to 321(1)-M(1), M(1) being an integer greater than 0. Further, as shown, the server system 311(j) and the server system 311(n) each have hardware components and software components that are similar to those of the server system 311(1).

Further, a monitoring system 302 monitors performance, health, and operation of each of the server systems 311(1) to 311(n). In particular, the monitoring system 302 may determine one or more load metrics of each of the server systems 311(1) to 311(n). Using the server system 311(1) as an example, the one or more load metrics may include the load of the CPU 352(1), which indicates the percentage of the computing power of the CPU 352(1) that is being used in a predetermined time period (e.g., from 1 minute ago to present). The one or more load metric may also include a usage rate of the memory 354(1), which indicates the percentage of the capacity of the memory 354(1) that is being used. The one or more load metric may also include an indicator of data read/write activities of the disk 356(1) in a predetermined time period (e.g., from 1 minute ago to present). For example, the indicator may indicate the amount of data read/write in the predetermined time period or the number/count of read/write operations in the predetermined time period. In addition, the number (i.e., M(1)) of VMs in the VMs 321(1)-1 to 321(1)-M(1) that are actively executed in the virtual machine execution space 202 may also be a load metric.

The monitoring system 302 may request information regarding the active VM percentage, the load of the CPU 352(1), the usage rate of the memory 354(1), and/or the data read/write rates of the disk 356(1) from the hypervisor 340(1). For example, the monitoring system 302 may send a request message to a communication interface of the hypervisor 340(1).

In another example, although a number of VMs (e.g., 30 VMs out of maximum 100 VMs allowed) are executed on the virtual machine execution space 202 of the server system 311(1), the virtual desktops running on those VMs may not be actively or continuously used by users. Therefore, the utilization of the server system 311(1) is low. Accordingly, despite of the number of active (or live) VMs, the monitoring system 302 may still determine that the load of the server system 311(1) is low based on the CPU load, the memory usage, and/or the disk activities.

Figure 4:
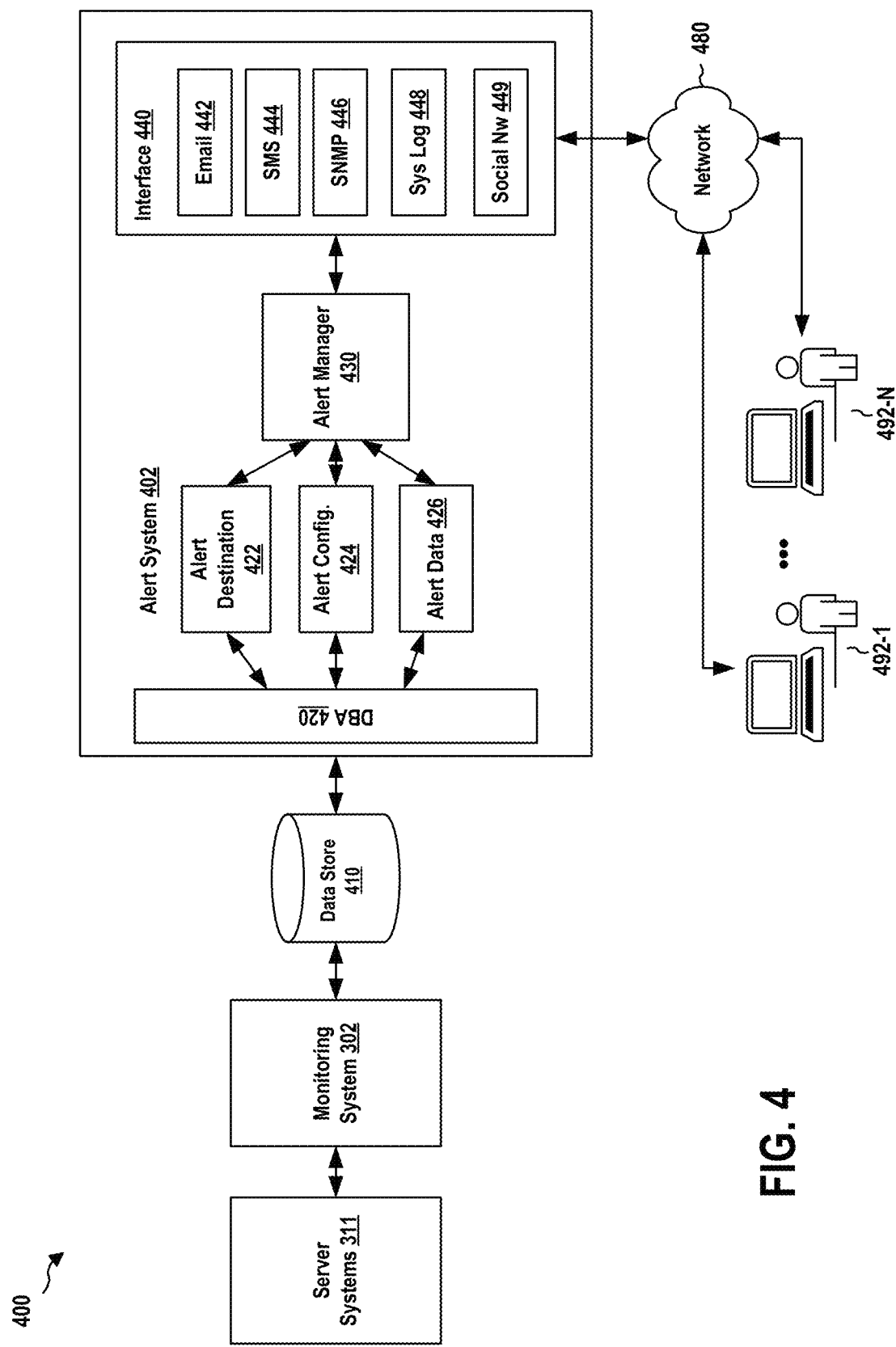
FIG. 4 is diagram illustrating a monitoring system and an alert system that service a VDI system.

FIG. 4 is diagram 400 illustrating that the monitoring system 302 and an alert system 402 service a VDI system. As described supra, the monitoring system 302 can collect resource utilization data (e.g., the load metrics) of server systems 311(1) to 311(n) in accordance with a schedule (e.g., periodically), and stores the data in the data store 410. The monitoring system 302 may provide a graphical user interface (GUI) that shows a graphical view representing the resource utilization as performance charts. The monitoring system 302 can use industry standard mechanisms and protocols such as Simple Network Management Protocol (SNMP), Windows Management Instrumentation (WMI), Secure Shell (SSH), and/or Web Services-Management (WSMAN) to communicate with the server systems 311(1) to 311(n) and to collect the resource utilization data from the server systems 311(1) to 311(n). In certain configurations, the server systems 311(1) to 311(n) each can include a host agent that collects and sends the resource utilization data to the monitoring system 302.

The resource utilization data collected by the monitoring system 302 may indicate, for each hypervisor of the server systems 311(1) to 311(n), the CPU usage (e.g., of the CPU 352(1)), the memory usage (e.g., of the memory 354(1)), the disk space utilized and the average number of disk read/writes (e.g., of the disk 356(1)), network traffic (e.g., of the NIC 358(1)), and the processes (e.g., of the server system 311(1)) that use more memory, network, etc.

The monitoring system 302 stores the resource utilization data collected into the data store 410. The monitoring system 302 can further perform health calculations regarding the server systems 311(1) to 311(n) based on the stored resource utilization data and certain configurable thresholds as described infra. These thresholds can be set based on policy requirements for the VDI system. The health of each of the server systems 311(1) to 311(n) can be determined as in one of several predetermined states such as Normal (Good), Warning, and Critical.

Further, the data store 410 can store thresholds data (e.g., current minimum and maximum values as well as the warning and critical thresholds) with respect to the components of the server systems 311(1) to 311(n) as follows:

| Component | Property | Min. | Warning | Critical | Max. |
|---|---|---|---|---|---|
| CPU | Load | 0% | 80% | 90% | 100% |
| Disk | Load | 0% | 80% | 90% | 100% |
| Memory | Load | 0% | 65% | 80% | 100% |
| Network | Load | 0% | 15% | 20% | 100% |
| Partition | Load | 0% | 80% | 90% | 100% |
| Process | CPU Load | 0% | 20% | 30% | 100% |
| Process | Memory Load | 0% | 20% | 30% | 100% |

As such, among other things, the monitoring system 302 can retrieve the resource utilization data of the server systems 311(1) to 311(n) and the threshold data from the data store 410. Then, as an example, the monitoring system 302 can evaluate the resource utilization data of the server system 311(1) according to the threshold data to determine: whether the load of the CPU 352(1) has reached the corresponding Warning threshold or Critical threshold, whether the disk space utilized or the disk read/write has reached the corresponding Warning threshold or Critical threshold, whether the load of the memory 354(1) has reached the corresponding Warning threshold or Critical threshold, whether the network traffic load of the NIC 358(1) has reached the corresponding Warning threshold or Critical threshold, whether the capacity of any partition of the disk 356(1) has reached the corresponding Warning threshold or Critical threshold, whether any process running on the server system 311(1) has used the percentage of the capacity of the CPU 352(1) to the corresponding Warning threshold or Critical threshold, and/or whether any process running on the server system 311(1) has used the percentage of the capacity of the memory 354(1) to the corresponding Warning threshold or Critical threshold. As such, the overall health of each of the server systems 311(1) to 311(n) may be determined by the collective status of several properties. For example, the four properties described supra of a server have reached the corresponding Critical thresholds, the monitoring system 302 can determine that the server is in a critical state.

In addition, the data store 410 may store the below thresholds regarding the software programs running or installed on the server systems 311(1) to 311(n).

| Property | Measurements | Warning | Critical |
|---|---|---|---|
| License Utilization | Installation Percentage | 80% | 90% |
| Unused Period | Days Since Last Used | 60 | 90 |
| Expiration date | Expires in Days | 90 | 60 |

The monitoring system 302 can communicate with the server systems 311(1) to 311(n) to collect the properties described supra of each program running or installed on the server systems 311(1) to 311(n) and generates corresponding resource utilization data. The monitoring system 302 then store those data in the data store 410.

The monitoring system 302 can examine the resource utilization data stored in the data store 410 and determine whether any software program running or installed on the server systems 311(1) to 311(n) has reached a Warning threshold or a Critical threshold. As such, the monitoring system 302 can determine the state of each of the programs.

In certain configurations, the monitoring system 302 can calculate performance of the server systems 311(1) to 311(n) in accordance with a schedule (e.g., periodically). Further, the monitoring system 302 can display the performance in a GUI, for example, as one or more performance charts. This performance calculation may be based on different performance counters such as: CPU-usage, system file control, system threads, disk read rate and write rate, memory usage, virtual memory usage, and network-data receive rate and data transmit rate.

Figure 5:
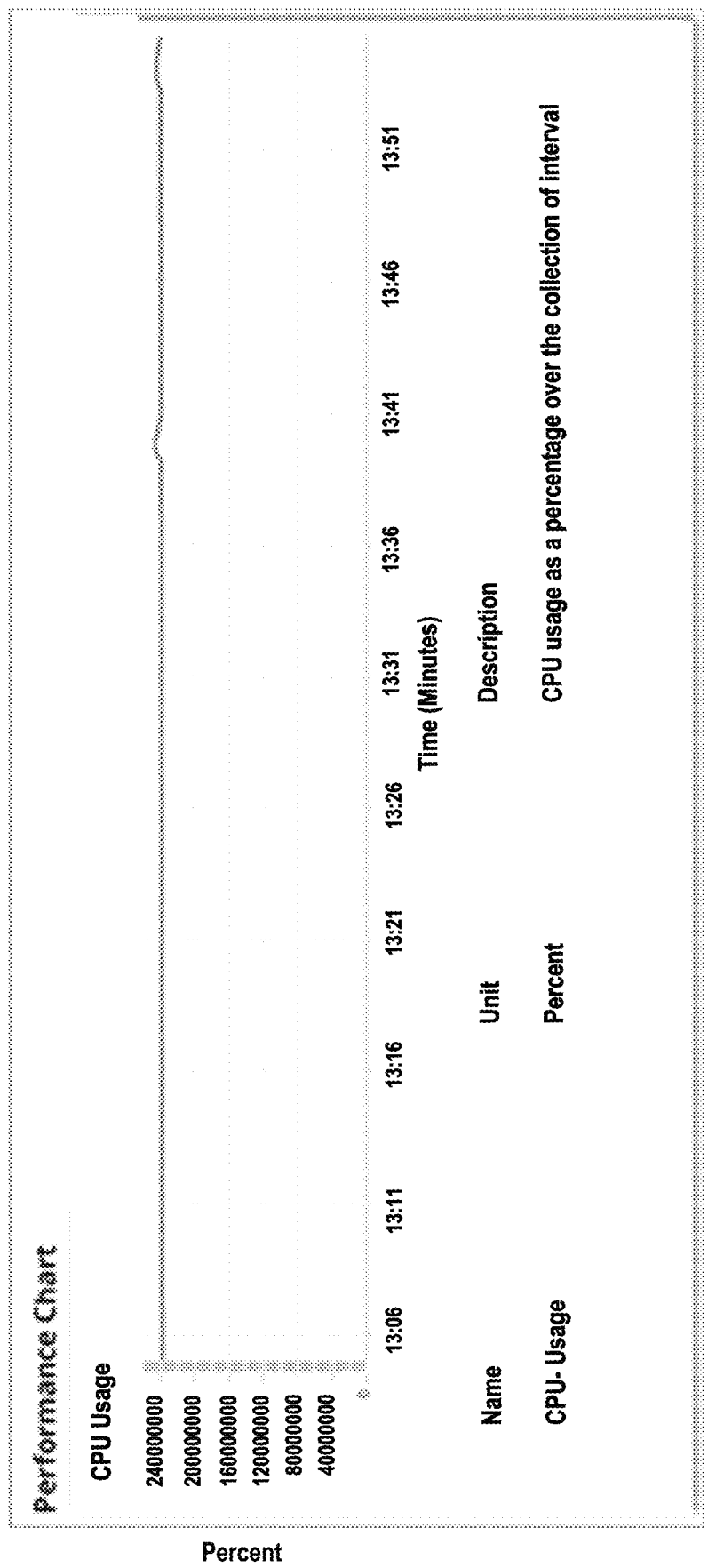
FIG. 5 is a diagram illustrating an exemplary performance chart of the CPU usage rendered by the monitoring system.

FIG. 5 is a diagram 500 illustrating an exemplary performance chart of the CPU usage rendered by the monitoring system 302.

Figure 6:
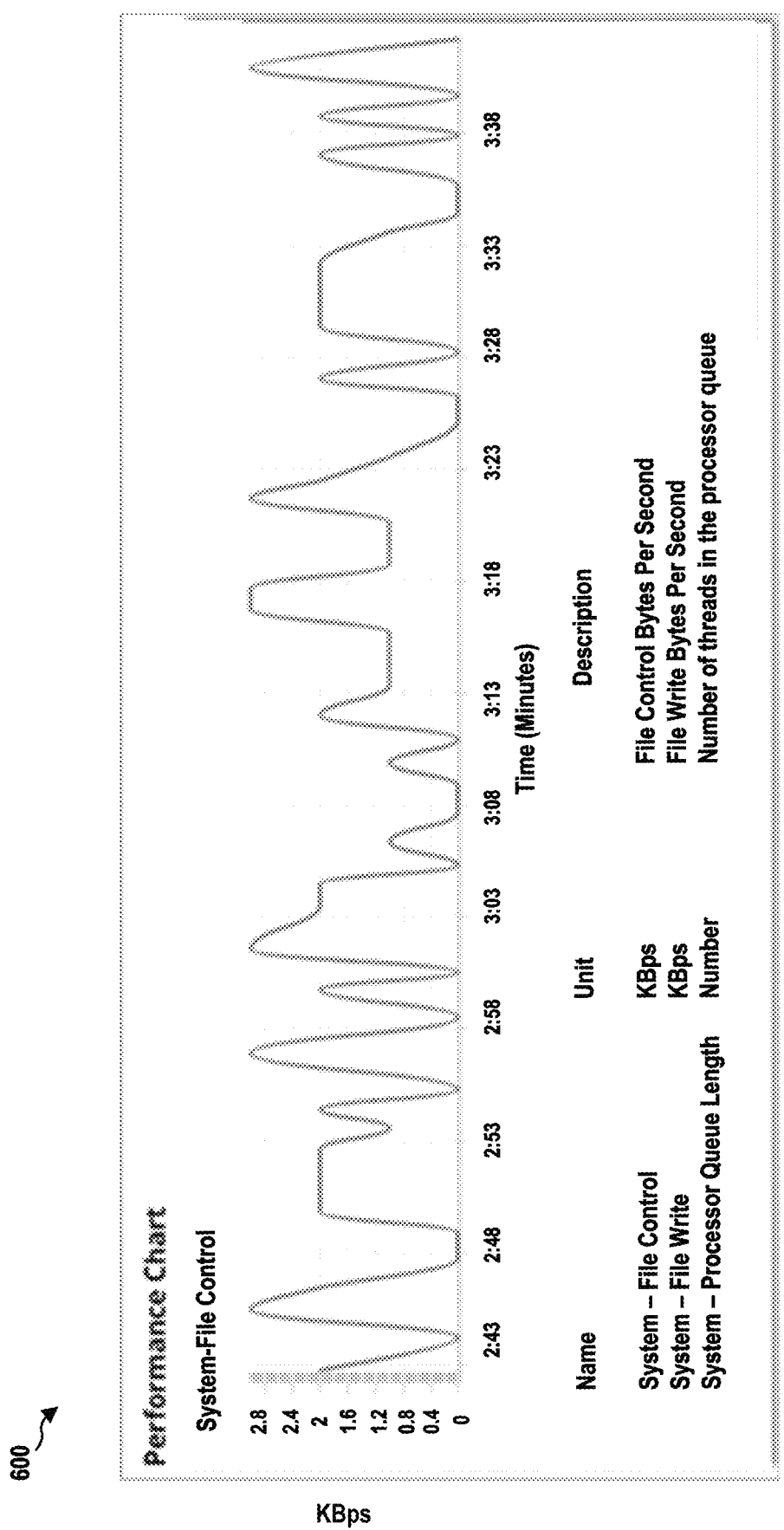
FIG. 6 is a diagram illustrating an exemplary performance chart of the system file control rendered by the monitoring system.

FIG. 6 is a diagram 600 illustrating an exemplary performance chart of the system file control rendered by the monitoring system 302.

Figure 7:
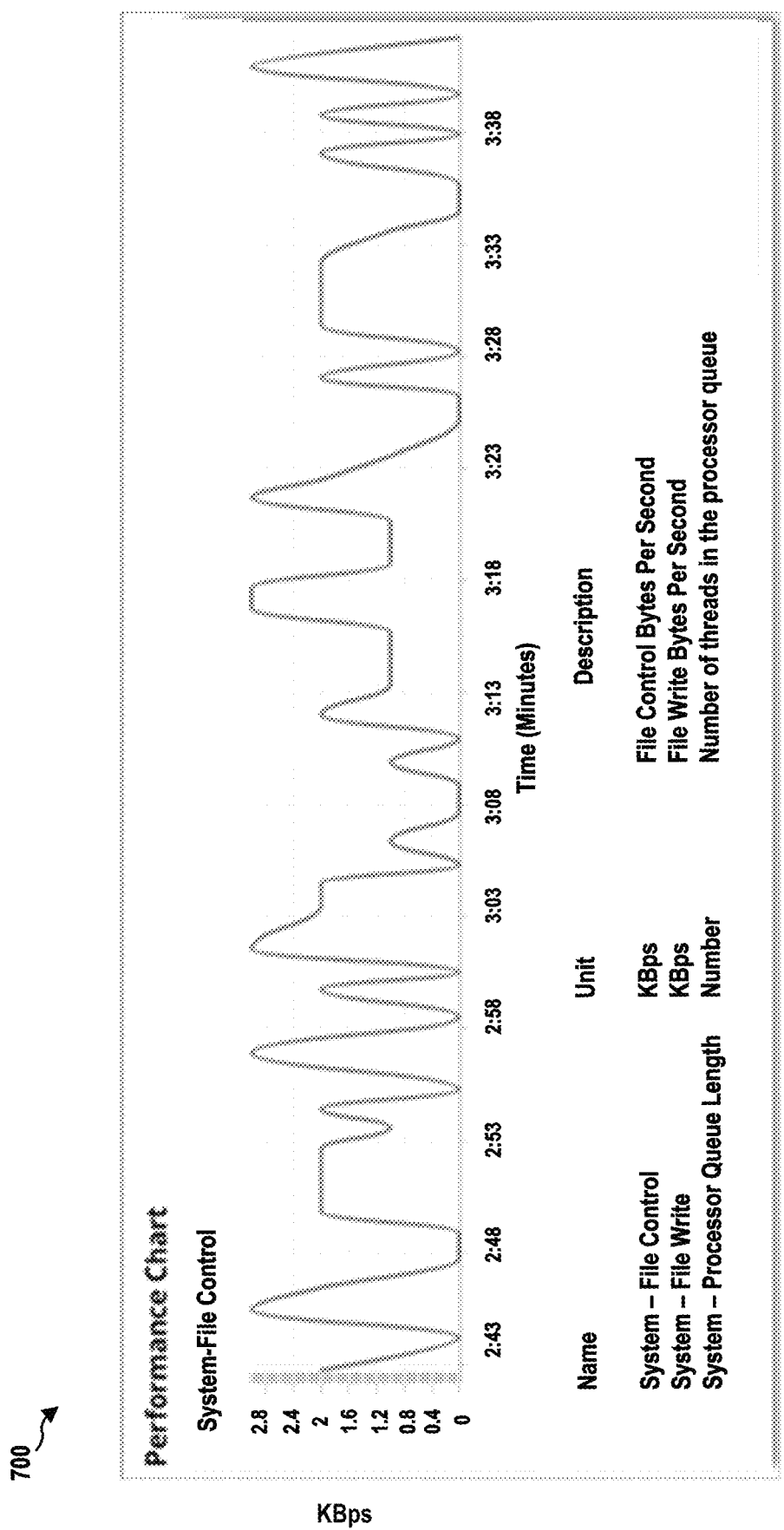
FIG. 7 is a diagram illustrating an exemplary performance chart of the disk read rate rendered by the monitoring system.

FIG. 7 is a diagram 700 illustrating an exemplary performance chart of the disk read rate rendered by the monitoring system 302.

Figure 8:
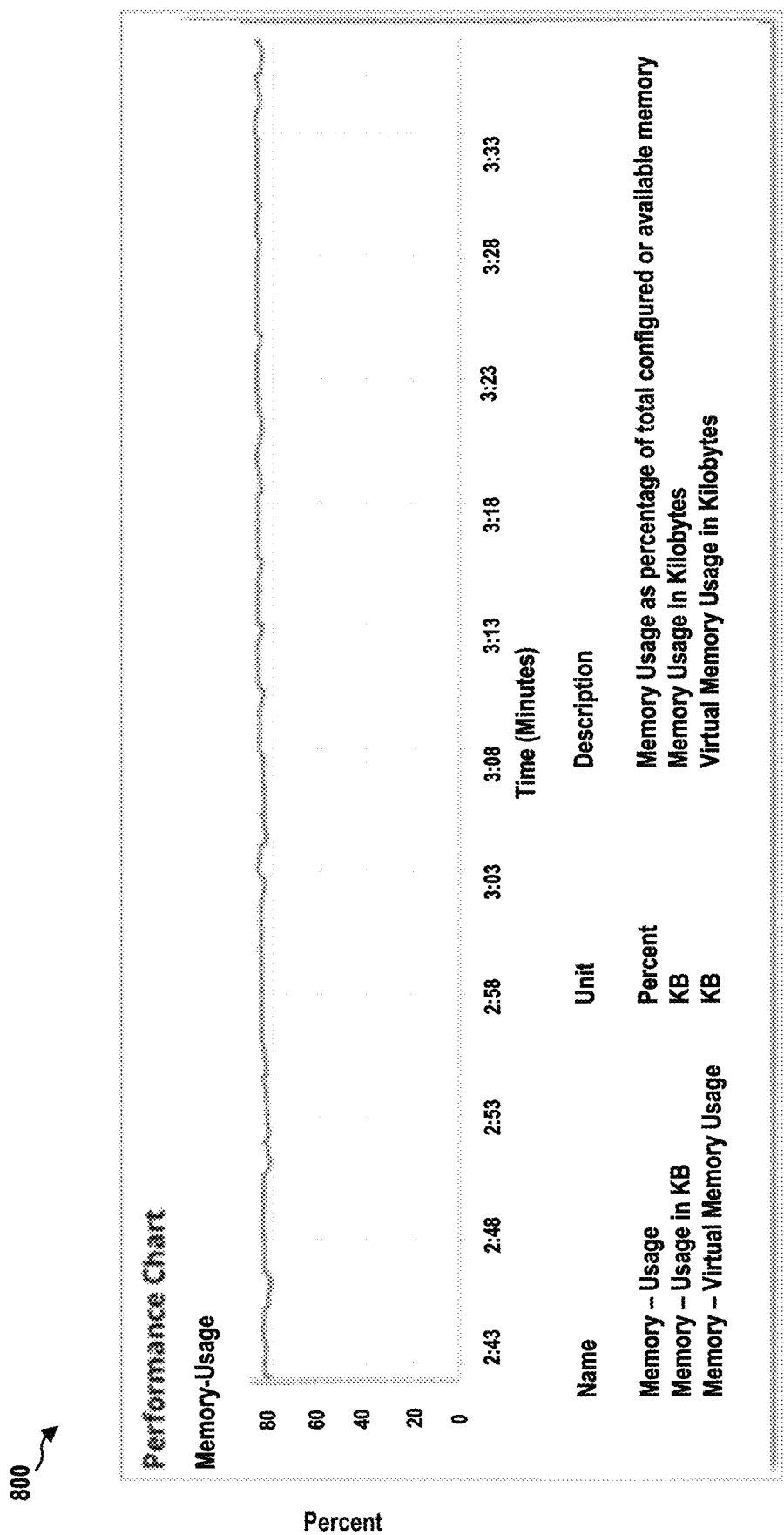
FIG. 8 is a diagram illustrating an exemplary performance chart of the memory usage rendered by the monitoring system.

FIG. 8 is a diagram 800 illustrating an exemplary performance chart of the memory usage rendered by the monitoring system 302.

Figure 9:
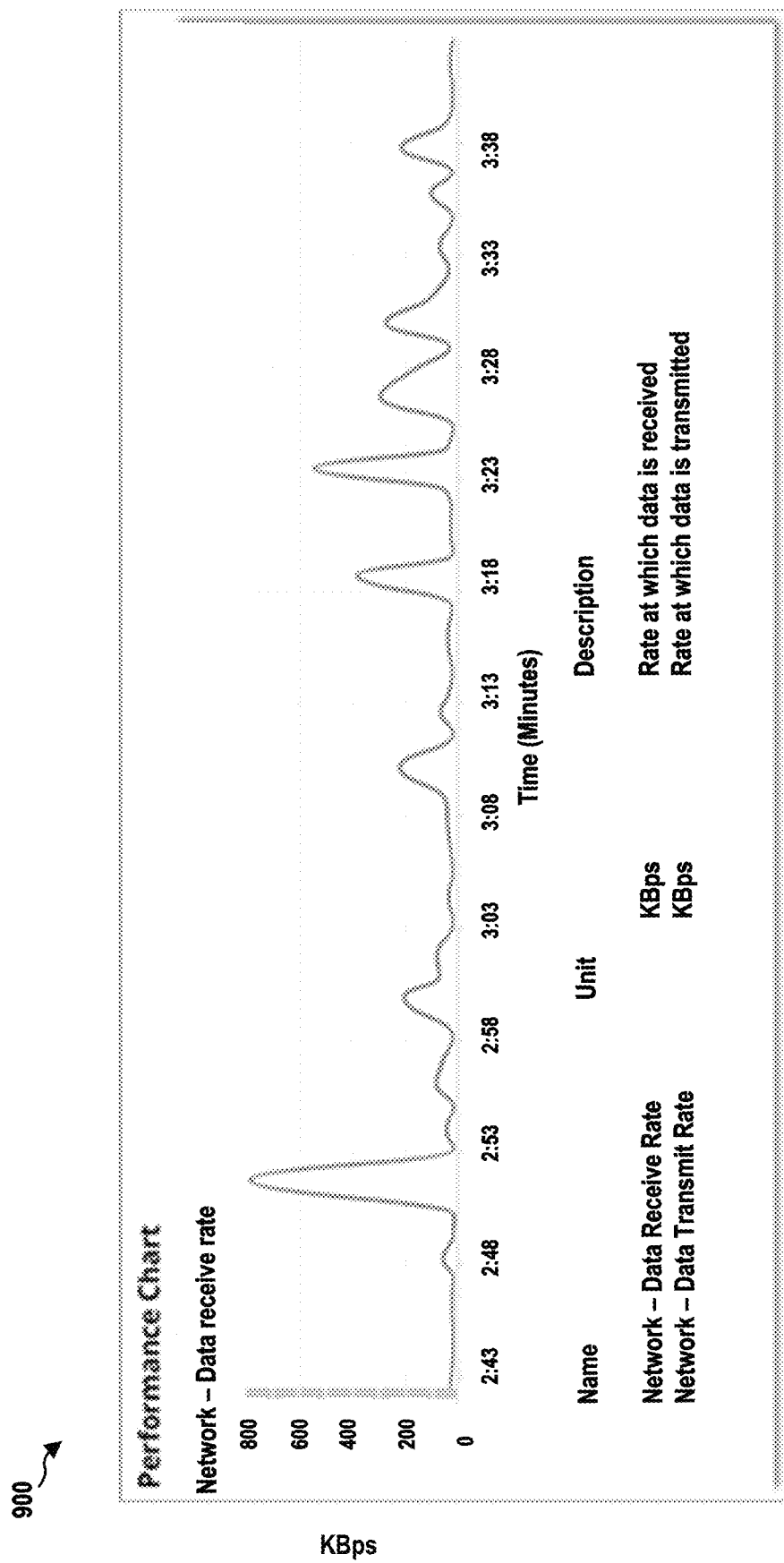
FIG. 9 is a diagram illustrating an exemplary performance chart of the network data receive rate rendered by the monitoring system.

FIG. 9 is a diagram 900 illustrating an exemplary performance chart of the network data receive rate rendered by the monitoring system 302.

As described supra, the monitoring system 302 can calculate health and performance data of the server systems 311(1) to 311(n) and health and performance data of the VMs (e.g., the VMs 321(1)-1 to 321(1)-M(1)) provided by the server systems 311(1) to 311(n) based on the resource utilization data and the threshold data. The monitoring system 302 further stores the health and performance data in the data store 410.

The alert system 402 includes a database access layer 420, an alert destination component 422, an alert configuration component 424, an alert data component 426, an alert manager 430, and interfaces 440. The alert system 402 retrieves the health and performance data from the data store 410, and examines the health and performance data to determine whether a server or its components are in an alert condition. The data store 410 may also store alert configuration data based on which the alert condition is determined. For example, the alert configuration may specify that, for a component of the server system 311(1), it is in an alert condition when the health and performance data of that component indicate that the component is in a warning state. As described infra, the alert system 402 can send alert messages to one or more alert destinations (e.g., designated receivers) in real time.

The database access layer 420 is a wrapper for accessing the data store 410. The database access layer 420 includes a library that exposes APIs for performing database operations required. In particular, the alert manager 430, the alert destination component 422, the alert configuration component 424, and the alert data component 426 can use the database access layer 420 to access any data from the data store 410.

The monitoring system 302 updates all health and performance data in the data store 410 based on the health calculations described supra. The alert manager 430 looks for the new alert data in the database, and uses appropriate interface to send the alert to the recipients configured.

The alert destination component 422 manages all types of alert destinations stored in the data store 410. The alert destinations may include email, email group, phone number, etc. The alert system 402 also provides a user interface that allows users to create, modify, and delete alert destinations.

As described supra, the data store 410 stores all data related to the alert system 402. The data may include alert recipients such as email addresses, email groups, and phone numbers. The data may also include alert configuration data. In addition, the data may include alert contents.

The alert configuration component 424 can configure different alerts based on the calculated health and performance data the server systems 311(1) to 311(n) and the alert configuration data. The alert configuration component 424 can also specifies the alert destinations for alert messages under different alert conditions. For example, alert messages generated under a critical alert condition may be sent to a first group of administrators by SMS, while alert messages generated under a warning alert condition may be sent to a second group of administrators by email. Based on the information provided by the alert configuration component 424, the alert manager 430 generates and sends one or more alert messages to a list of alert destinations or designated receivers (e.g., alert destinations 492-1 to 492-N). The alert system 402 may also provide a user interface through which an administrator can input alert configurations.

Further, the alert configuration component 424 handles the configuration data needed for sending alert messages through one or more communication services over a network 480, which can be accessed through the interfaces 440. The configuration data may include user credentials, server configuration data, protocol configuration data, etc. For example, with respect to an email service, the configuration data include Email Server IP or Name, User Name used to log in the email service, Password used to log in the email service. With respect to a Short Message Service (SMS), the configuration data include a SMS server IP. With respect to a Simple Network Management Protocol (SNMP) service, the configuration data may include an enterprise ID. With respect to a system log service the configuration data may include the type of the system log such as information log, warning log, and error log.

In particular, with respect to generating alert messages for software programs running or installed on the server systems 311(1) to 311(n), the configuration data (which are stored in the data store 410) may specify the criteria for generating an alert message. The criteria may include whether the status of a scheduled job is successful, failed, or initiated (which is stored in the data store 410 as health and performance data).

The criteria may include the importance/severity of a patch that is to be installed such as critical, important, or optional. Further, for a licensed software program, the criteria may include the license utilization threshold, the unused period threshold, and the expiration date threshold, as described supra. Further, the configuration data may specify the destinations/recipients (e.g., an email address or a phone number) of an alert message generated in accordance with the criteria.

With respect to generating alert messages relating to the health of the server systems 311(1) to 311(*n*), the configuration data may also specify the criteria for generating an alert message. As one example, the criteria may include a selected threshold (e.g., one of the normal, warning, or critical threshold) that need to be reached by a health-related property described supra (e.g., the CPU load). Further, the configuration data also specify the destinations/recipients (e.g., an email address or a phone number) of an alert message generated in accordance with the criteria.

With respect to generating alert messages relating to the performance of the server systems 311(1) to 311(*n*), the configuration data may specify the criteria for generating an alert message. As one example, the criteria may include the disk write count. Further, the configuration data also specify the destinations/recipients (e.g., an email address or a phone number) of an alert message generated in accordance with the criteria.

The alert data component 426 manages the alert data, which are the data to be included in an alert message. The alert data component 426 can retrieve the alert content data from the data store 410 and provide the alert content data to the alert manager 430 for constructing an alert message. The alert content data may have one or more parameters based on alert types.

The alert manager 430 provides the alert functionalities. The alert manager 430 continuously monitors the data store 410 to detect new alert data, to identify the appropriate interface, and to construct and send the corresponding alert message. Subsequently, the alert manager 430 also updates the data indicating alert sent status in the data store 410, and wait for the new alert data in the data store 410. The alert manager 430 may use an interface of the interfaces 440 to send the alert message.

The interfaces 440 include libraries that expose APIs for sending alert messages through various communication services. The interfaces 440 include an email interface 442, which can be used to send email alerts to one or more destinations. The alert manager 430 obtains email configuration parameters from the alert configuration component 424 and configures the email interface 442 accordingly to access an email server to send alert messages. The alert manager 430 obtains alert content data from the alert data component 426 to compose the subject, the content, and any attachments of an email message. The alert manager 430 then send the email message through the email interface 442. The email interface 442 may allow configurations for both internal and external networks.

The interfaces 440 also include an SMS interface 444, which handles SMS alert messages. The alert manager 430 obtains subject and contents of an SMS message from the alert data component 426 The alert manager 430 sends SMS messages to one or more destinations through the SMS interface 444.

The interfaces 440 include an SNMP interface 446, which handles SNMP traps (e.g., software alerts). The SNMP interface 446 follows SNMP specification and requires parameters such as Object Identifiers (OIDs), generic trap IDs, specific trap IDs, and variable binding data to send the trap. This SNMP interface 446 may also require the destination details regarding where the traps are to be sent.

The interfaces 440 include a system log interface 448, which allows logging the alert data into the operating system's event log. Platform specific protocols can be used to log the events. For example, WINDOWS® system event log requires parameters such as Type, Date, Time, Source, Category, User, Computer name, etc. LINUX® system uses similar parameters.

The interfaces 440 may also include a social network interface 449 that can be used to request one or more social network services to send alert messages.

In addition, the alert system 402 may show a message box, or add a quick launch icon with balloon popup, as part of the alert. When the balloon popup is clicked, the alert system 402 may open the application user interface (UI)/WebUI or System Event Log for the complete details of the alert. This can be synchronized with Database log and System Event Log. By default, all alert data will be stored in the system event log of the alert system 402. Application software can provide user interface to show the alert details.

The alert system 402 provides options to take certain actions automatically by the alert system 402 as part of performance monitoring and alerting. By doing some administrative actions as preventive maintenance, the resource utilization may be reduced and the server systems 311(1) to 311(*n*) can be kept up and running on normal health.

The alert system 402 monitors the data store 410. When a threshold is hit, the alert system 402 can initiate optimization tasks. For example, in certain configurations, the alert system 402 can request the server systems 311(1) to 311(*n*) to terminate idle user sessions running on the virtual machines, shut down virtual machines that are not used by any user, un-install unused software, and/or clean up temporary folder and files.

Figure 10:
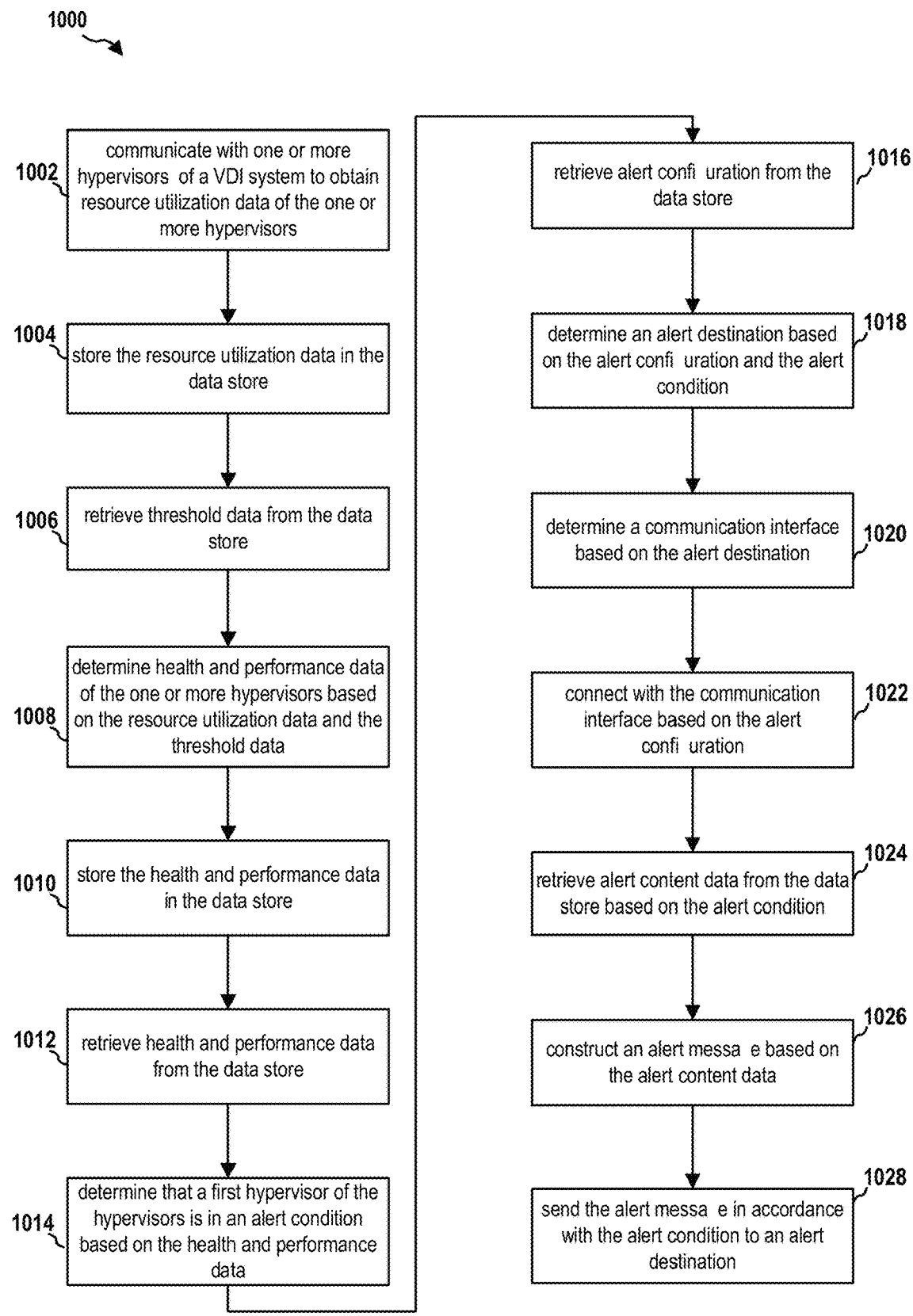
FIG. 10 is a flow chart of a method (process) for monitoring a VDI system.

FIG. 10 is a flow chart 1000 of a method (process) for monitoring a VDI system. The method may be performed by a monitoring device (e.g., the monitoring system 302 and the apparatus 302/302') and an alert device (e.g., the alert system 402 and the apparatus 402/402'). In certain configurations, at operation 1002, the monitoring device communicates with one or more hypervisors of the VDI system to obtain resource utilization data of the one or more hypervisors. At operation 1004, the monitoring device stores the resource utilization data in a data store. In certain configurations, the resource utilization data include processor usage data, memory usage data, disk usage data, and network traffic data of each hypervisor of the one or more hypervisors. In certain configurations, the resource utilization data further includes installed license data, expiration date data, and unused time period data of at least one program running or installed on the hypervisors.

At operation 1006, the monitoring device retrieves threshold data from the data store. At operation 1008, the monitoring device determines health and performance data of the one or more hypervisors based on the resource utilization data and the threshold data. At operation 1010, the monitoring device stores the health and performance data in the data store.

At operation 1012, the alert device retrieves health and performance data from the data store. At operation 1014, the alert device determines that a first hypervisor of the one or more hypervisors is in an alert condition based on the health and performance data.

At operation 1016, the alert device retrieves alert configuration from the data store. At operation 1018, the alert device determines an alert destination based on the alert configuration and the alert condition. At operation 1020, the alert device determines a communication interface based on the alert destination. In certain configurations, the communication interface is determined from an email interface, a Short Message Service (SMS) interface, a Simple Network Management Protocol (SNMP) interface, a system log interface, and a social network interface. At operation 1022, the alert device connects with the communication interface based on the alert configuration.

At operation 1024, the alert device retrieves alert content data from the data store based on the alert condition. At operation 1026, the alert device constructs the alert message based on the alert content data. At operation 1028, the alert device sends the alert message in accordance with the alert condition to the alert destination via the communication interface.

Figure 11:
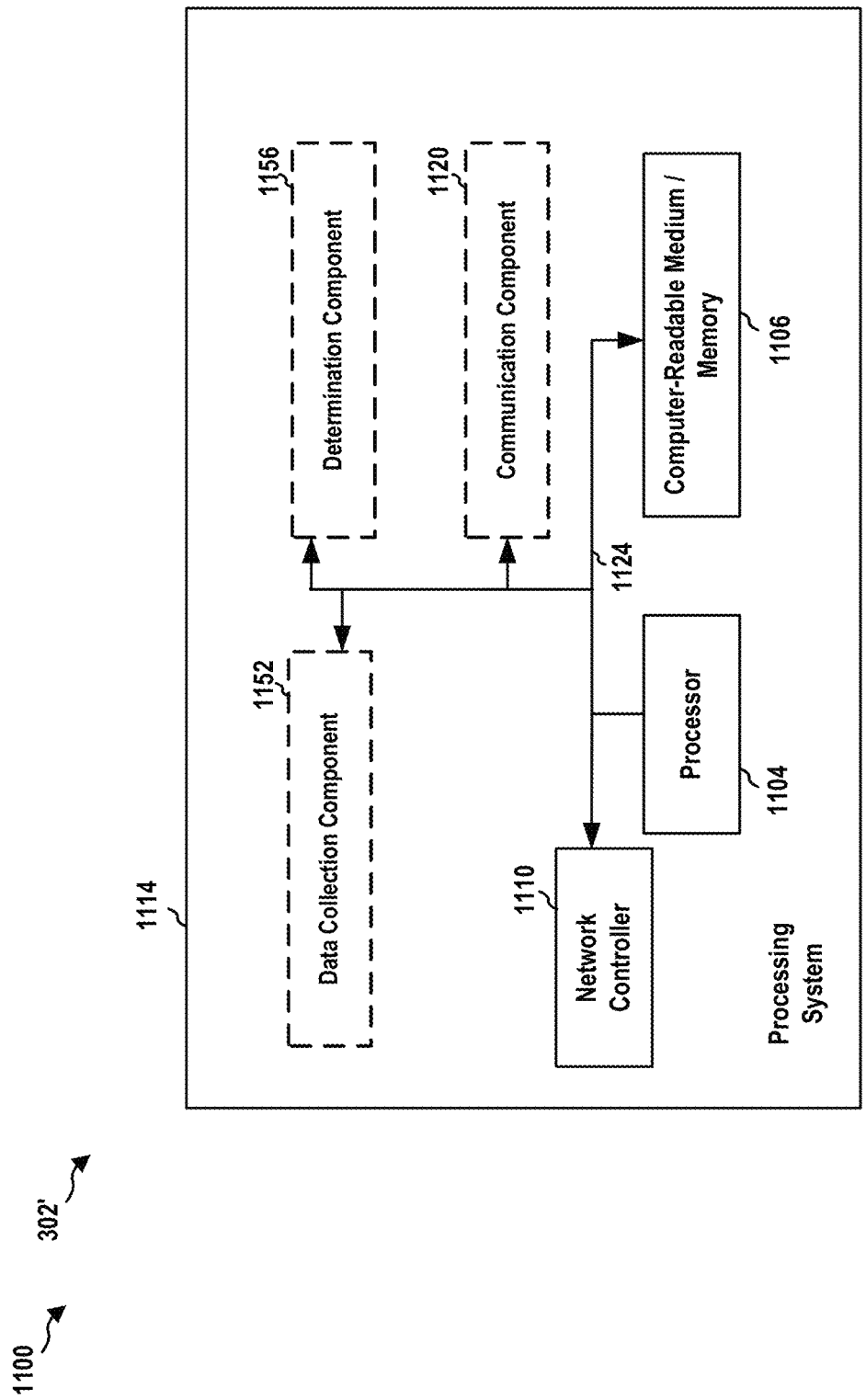
FIG. 11 is a diagram illustrating an example of a hardware implementation for an apparatus employing a processing system.

FIG. 11 is a diagram 1100 illustrating an example of a hardware implementation for an apparatus 302' (e.g., the monitoring system 302) employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, including the processor 1104 the computer-readable medium/memory 1106, and the network controller 1110. The bus 1124 may also link various other circuits such as timing sources, peripherals, voltage regulators, and power management circuits, which are well known in the art, and therefore, will not be described any further.

The processing system 1114 may be coupled to a network controller 1110. The network controller 1110 provides a means for communicating with various other apparatus over a network. The network controller 1110 receives a signal from the network, extracts information from the received signal, and provides the extracted information to the processing system 1114, specifically the communication component 1120. In addition, the network controller 1110 receives information from the processing system 1114, specifically the communication component 1120, and based on the received information, generates a signal to be sent to the network. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system further includes at least one of the data collection component 1152 and the determination component 1156. The components may be software components running in the processor 1104, resident/stored in the computer readable medium/memory 1106, one or more hardware components coupled to the processor 1104, or some combination thereof.

The apparatus 302/302' may be configured to include means for performing each of the operations performed by the monitoring device described supra referring to FIG. 10. The aforementioned means may be one or more of the aforementioned components of the apparatus 302 and/or the processing system 1114 of the apparatus 302' configured to perform the functions recited by the aforementioned means.

Figure 12:
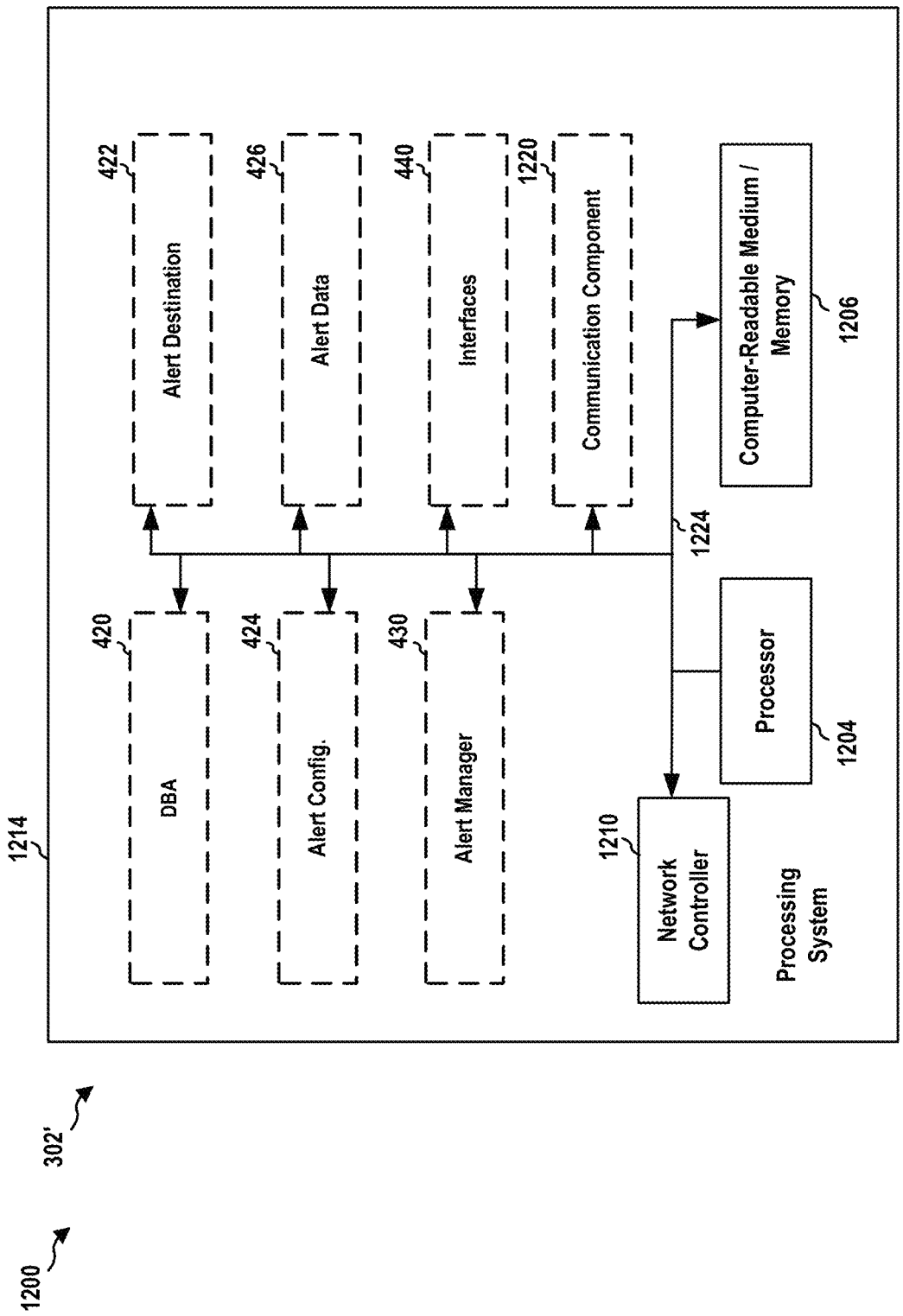
FIG. 12 is a diagram illustrating another example of a hardware implementation for an apparatus employing a processing system.

FIG. 12 is a diagram 1200 illustrating an example of a hardware implementation for an apparatus 402' (e.g., the monitoring system 302) employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, including the processor 1204 the computer-readable medium/memory 1206, and the network controller 1210. The bus 1224 may also link various other circuits such as timing sources, peripherals, voltage regulators, and power management circuits, which are well known in the art, and therefore, will not be described any further.

The processing system 1214 may be coupled to a network controller 1210. The network controller 1210 provides a means for communicating with various other apparatus over a network. The network controller 1210 receives a signal from the network, extracts information from the received signal, and provides the extracted information to the processing system 1214, specifically the communication component 1220. In addition, the network controller 1210 receives information from the processing system 1214, specifically the communication component 1220, and based on the received information, generates a signal to be sent to the network. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system further includes at least one of the database access layer 420, the alert destination component 422, the alert configuration component 424, the alert data component 426, the alert manager 430, the interfaces 440. The components may be software components running in the processor 1204, resident/stored in the computer readable medium/memory 1206, one or more hardware components coupled to the processor 1204, or some combination thereof.

The apparatus 402/402' may be configured to include means for performing each of the operations performed by the alert device described supra referring to FIG. 10. The aforementioned means may be one or more of the aforementioned components of the apparatus 402 and/or the processing system 1214 of the apparatus 402' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of monitoring a virtual desktop infrastructure (VDI) system, comprising:
    storing, by a monitoring device of the VDI system, health and performance data of one or more hypervisors of the VDI system in a data store, wherein the data store is a database on a data device separate from the monitoring device and an alert device of the VDI system, wherein the alert device accesses the data store through a database access layer at the alert device, wherein the datastore stores an alert configuration and alert data;
    determining, at the alert device, that a first hypervisor of the one or more hypervisors is in an alert condition based on the health and performance data and the alert configuration stored in the data store, and determining corresponding alert data stored in the data store to be included in an alert massage;
    continuously monitoring, by the alert device, the datastore to detect the alert data based on a status indication associated with the alert data that is stored in the data store and indicates that the alert data have not been sent to an alert destination;
    in response to detecting the alert data in the data store, terminating, by the alert device and in accordance with the alert condition, idle user sessions running on virtual machines of the first hypervisor or shutting down virtual machines of the first hypervisor that are not used by any user;
    determining, by the alert device, the alert destination based on the alert configuration and the alert condition;
    selecting, by the alert device, a communication interface from a plurality of communication interfaces based on the alert destination and the alert data to be included in the alert message;
    connecting, by the alert device, with the communication interface based on the alert configuration;
    sending, by the alert device, the alert message including the alert data in accordance with the alert condition to the alert destination via the communication interface; and
    updating, by the alert device, the status indication associated with the alert data stored in the data store to indicate that the alert data have been sent to the alert destination.

2. The method of claim 1, further comprising:
    communicating with the one or more hypervisors to obtain resource utilization data of the one or more hypervisors;
    storing the resource utilization data in the data store;
    retrieving threshold data from the data store;
    determining the health and performance data of the one or more hypervisors based on the resource utilization data and the threshold data; and
    storing the health and performance data in the data store.

3. The method of claim 2, wherein the resource utilization data include processor usage data, memory usage data, disk usage data, and network traffic data of each hypervisor of the one or more hypervisors;
    wherein the resource utilization data further includes installed license data, expiration date data, and unused time period data of at least one program running or installed on the one or more hypervisors.

4. The method of claim 1, wherein the communication interface is determined from an email interface, a Short Message Service (SMS) interface, a Simple Network Management Protocol (SNMP) interface, a system log interface, and a social network interface.

5. The method of claim 1, further comprising:
    retrieving the alert data from the data store based on the alert condition; and
    constructing the alert message based on the alert data.

6. A computer system for monitoring a virtual desktop infrastructure (VDI) system, comprising:
    a memory; and
    at least one processor coupled to the memory and configured to:
        store, by a monitoring device of the VDI system, health and performance data of one or more hypervisors of the VDI system in a data store, wherein the data store is a database on a data device separate from the monitoring device and an alert device of the VDI system, wherein the alert device accesses the data store through a database access layer at the alert device, wherein the datastore stores an alert configuration and alert data;
        determine, at the alert device, that a first hypervisor of the one or more hypervisors is in an alert condition based on the health and performance data and the alert configuration stored in the data store, and determining corresponding alert data stored in the data store to be included in an alert massage;
        continuously monitor, by the alert device, the datastore to detect the alert data based on a status indication associated with the alert data that is stored in the data store and indicates that the alert data have not been sent to an alert destination;

in response to detecting the alert data in the data store, terminate, by the alert device and in accordance with the alert condition, idle user sessions running on virtual machines of the first hypervisor or shut down virtual machines of the first hypervisor that are not used by any user;

determine, by the alert device, the alert destination based on the alert configuration and the alert condition;

select, by the alert device, a communication interface from a plurality of communication interfaces based on the alert destination and the alert data to be included in the alert message;

connect, by the alert device, with the communication interface based on the alert configuration;

send, by the alert device, the alert message including the alert data in accordance with the alert condition to the alert destination via the communication interface; and update, by the alert device, the status indication associated with the alert data stored in the data store to indicate that the alert data have been sent to the alert destination.

7. The computer system of claim 6, wherein the at least one processor is further configured to:

communicate with the one or more hypervisors to obtain resource utilization data of the one or more hypervisors;

store the resource utilization data in the data store;

retrieve threshold data from the data store;

determine the health and performance data of the one or more hypervisors based on the resource utilization data and the threshold data; and store the health and performance data in the data store.

8. The computer system of claim 7, wherein the resource utilization data include processor usage data, memory usage data, disk usage data, and network traffic data of each hypervisor of the one or more hypervisors;

wherein the resource utilization data further includes installed license data, expiration date data, and unused time period data of at least one program running or installed on the one or more hypervisors.

9. The computer system of claim 6, wherein the communication interface is determined from an email interface, a Short Message Service (SMS) interface, a Simple Network Management Protocol (SNMP) interface, a system log interface, and a social network interface.

10. The computer system of claim 6, wherein the at least one processor is further configured to:

retrieve the alert data from the data store based on the alert condition; and construct the alert message based on the alert content data.

11. A non-transitory computer-readable medium storing computer executable code for monitoring a virtual desktop infrastructure (VDI) system, comprising code to:

store, by a monitoring device of the VDI system, health and performance data of one or more hypervisors of the VDI system in a data store, wherein the data store is a database on a data device separate from the monitoring device and an alert device of the VDI system, wherein the alert device accesses the data store through a database access layer at the alert device, wherein the datastore stores an alert configuration and alert data;

perform, by the monitoring device, health calculations based on the health and performance data stored in the data store and one or more thresholds stored in the data store, wherein the data store is a database on a data device separate from the monitoring device and an alert device of the VDI system, wherein the alert device accesses the data store through a database access layer at the alert device;

determine, at the alert device, that a first hypervisor of the one or more hypervisors is in an alert condition based on the health and performance data and the alert configuration stored in the data store, and determining corresponding alert data stored in the data store to be included in an alert massage;

continuously monitor, by the alert device, the datastore to detect the alert data based on a status indication associated with the alert data that is stored in the data store and indicates that the alert data have not been sent to an alert destination;

in response to detecting the alert data in the data store, terminate, by the alert device and in accordance with the alert condition, idle user sessions running on virtual machines of the first hypervisor or shut down virtual machines of the first hypervisor that are not used by any user;

determine, by the alert device, the alert destination based on the alert configuration and the alert condition;

select, by the alert device, a communication interface from a plurality of communication interfaces based on the alert destination and the alert data to be included in the alert message;

connect, by the alert device, with the communication interface based on the alert configuration;

send, by the alert device, the alert message including the alert data in accordance with the alert condition to the alert destination via the communication interface; and update, by the alert device, the status indication associated with the alert data stored in the data store to indicate that the alert data have been sent to the alert destination.

12. The non-transitory computer-readable medium of claim 11, wherein the code is further configured to:

communicate with the one or more hypervisors to obtain resource utilization data of the one or more hypervisors;

store the resource utilization data in the data store;

retrieve threshold data from the data store;

determine the health and performance data of the one or more hypervisors based on the resource utilization data and the threshold data; and store the health and performance data in the data store.

13. The non-transitory computer-readable medium of claim 12, wherein the resource utilization data include processor usage data, memory usage data, disk usage data, and network traffic data of each hypervisor of the one or more hypervisors;

wherein the resource utilization data further includes installed license data, expiration date data, and unused time period data of at least one program running or installed on the one or more hypervisors.

14. The non-transitory computer-readable medium of claim 11, wherein the communication interface is determined from an email interface, a Short Message Service (SMS) interface, a Simple Network Management Protocol (SNMP) interface, a system log interface, and a social network interface.

* * * * *